United States Patent [19]
Johnson

[11] 3,944,738
[45] Mar. 16, 1976

[54] METHOD TO INCREASE THE VISIBILITY OF GAME OBJECTS DURING TELECASTING

[75] Inventor: James William Johnson, Marine-on-St. Croix, Minn.

[73] Assignee: Minnesota Mining and Manufacturing Company, St. Paul, Minn.

[22] Filed: Dec. 11, 1973

[21] Appl. No.: 423,699

[52] U.S. Cl............ 178/7.2; 178/DIG. 21; 273/1 B; 273/DIG. 28
[51] Int. Cl.².................... H04N 5/38; A63B 67/00
[58] Field of Search.... 273/DIG. 24, DIG. 28, 58 G, 273/58 R, 235 B, 128 R, 1 B; 340/323; 350/105, 97; 324/175; 178/DIG. 20, DIG. 21, DIG. 33, DIG. 34, 6.8, DIG. 1, 7.2, DIG. 6, DIG. 8

[56] References Cited
UNITED STATES PATENTS

| | | | |
|---|---|---|---|
| 1,747,664 | 2/1930 | Droitcour | 178/DIG. 21 |
| 3,019,292 | 1/1962 | John | 178/6.8 |
| 3,034,406 | 5/1962 | McKenzie et al. | 350/105 |
| 3,840,699 | 10/1974 | Bowerman | 178/DIG. 34 |

Primary Examiner—Benedict V. Safourek
Assistant Examiner—R. John Godfrey
Attorney, Agent, or Firm—Alexander, Sell, Steldt & DeLaHunt

[57] ABSTRACT

A method for enhancing the visibility on a television screen of small difficult-to-see game objects that are thrown or shot according to the rules of the game. The method comprises photographing the game while the game object that is being used in the game carries a retroreflective layer attached to the exterior surface of the object; and projecting a light beam parallel to the optical axis of said television camera so that light retroreflected by said retroreflective layer causes a visible contrast between the image of the game object and the image of the background for the object in a telecast picture.

4 Claims, 3 Drawing Figures

METHOD TO INCREASE THE VISIBILITY OF GAME OBJECTS DURING TELECASTING

BACKGROUND OF THE INVENTION

Television viewing of a hockey match is hampered by poor visibility on the television screen of the hockey puck. The puck is small, and it is passed, shot, and deflected at high speed. In addition, a television viewer sees only a limited portion of the whole hockey match, and the scene being viewed rapidly changes as the television camera moves to follow the action. As a result, it is difficult to follow the puck from player to player, and it is especially difficult to follow the puck as it is shot toward the goal and either deflected, caught or missed by the goal tender. For most viewers, recognition that a goal has been scored probably comes after the fact, when a signal light is lighted or the announcer informs the viewers that a goal has been scored. Although hockey is a popular sport, telecasts of hockey matches would have wider appeal and would be more fully enjoyed if the movement of the puck could be more closely followed.

SUMMARY OF THE INVENTION

Briefly, a method of the invention, which is useful to enhance the visibility on a television screen of any small, difficult-to-see game object that is shot or thrown according to the rules of a game that is being telecast, comprises:

1. photographing said game with at least one television camera while the said object that is being used in the game carries a retroreflective layer attached to the exterior surface of the object;
2. projecting toward the game a light beam that is parallel to, and no more than slightly spaced from, the optical axis of said television camera, so that the lens of the camera will be within the cone of light from said light beam that is retroreflected by the object; and
3. telecasting the picture photographed by the camera, whereby there is a visible contrast between the image of the object and the image of the background for the object on the screen of television receivers that receive the telecast picture.

DETAILED DESCRIPTION

Figure 1:
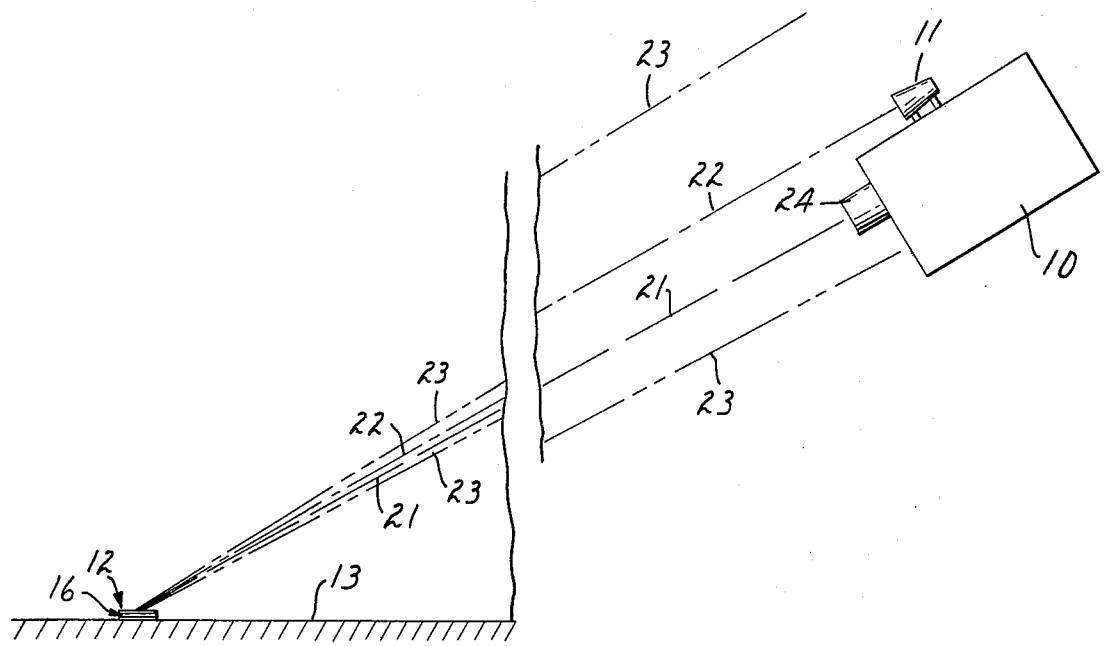
FIG. 1 is a schematic diagram of apparatus used in accordance with the invention for telecasting a hockey match.
Figure 2:
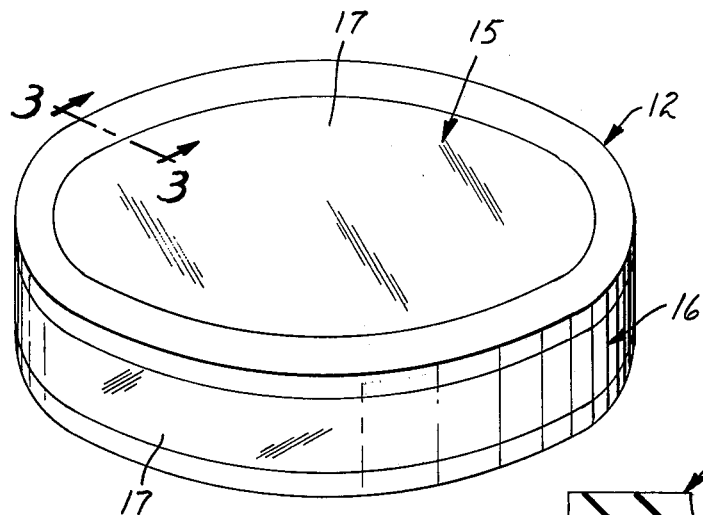
FIG. 2 is a perspective view of a hockey puck that is useful according to the present invention.

FIG. 1 schematically illustrates an arrangement of apparatus useful in the invention, including a television camera 10 and a lamp 11 attached to the camera, which are both directed at a rink where a hockey match is being played. A hockey puck 12 on the rink surface 13 is within the scene photographed by the camera 10. The hockey puck 12 has at least one retroreflective layer attached to its exterior surface, and may take the form illustrated in FIGS. 2 and 3. As shown in FIG. 2, the hockey puck 12 carries a retroreflective layer 15 on its top surface, a corresponding retroreflective layer on its bottom surface, and a retroreflective layer 16 as a band around the cylindrical side surface of the puck.

The retroreflective layers on the hockey puck 12 may be provided by a variety of commercially available retroreflective sheet materials, but a preferred sheet material is an "exposed-lens" sheet material such as described in U.S. Pat. No. 3,382,908 or 3,449,201. The sheet material described in those patents generally comprises a monolayer of solid glass microspheres partially embedded in an elastomeric support sheet and partially exposed above the support sheet. Specular reflective means underlie the embedded surfaces of the microspheres; in the described sheeting the specular reflective means comprises a layer of metal vapor-deposited on the embedded surface of the microspheres. Light rays travel to the glass microspheres, are refracted within the microspheres so as to focus generally on the specular reflective means, and then are returned along substantially the same path that they traveled to the microspheres. Retroreflection occurs even when light rays strike the retroreflective surface at an angle to a line perpendicular or normal to the retroreflective surface. This property is known as "angularity", and for preferred retroreflective materials it permits retroreflection of rays striking the retroreflective surface at an angle of 60° or more. Because of the exposed nature of the glass microspheres in the described exposed-lens sheeting, the sheeting provides a high degree of reflection; and because the microspheres are embedded in elastomer, the retroreflective layer has greater durability.

Figure 3:
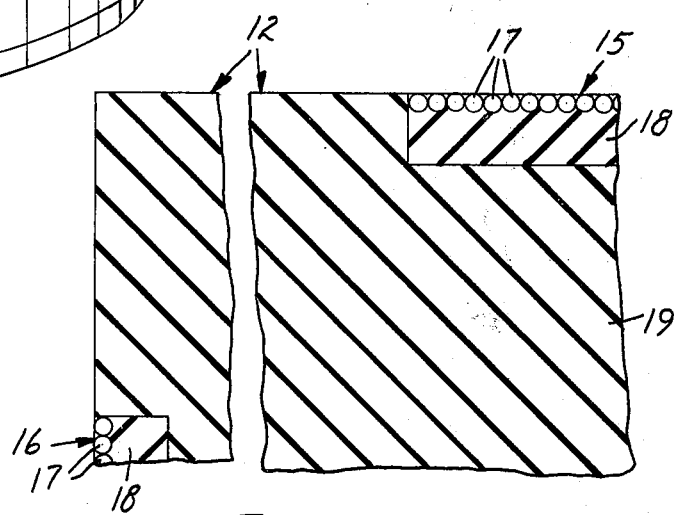
FIG. 3 is a partial sectional view taken along the lines 3—3 of FIG. 2.

The construction of the preferred retroreflective layers is illustrated in more detail in FIG. 3, which is a greatly enlarged partial view taken along the lines 3—3 of FIG. 2. FIG. 3 shows a monolayer of glass microspheres 17 partially embedded in a support sheet 18 of elastomer, which is adhered to the main body 19 of the hockey puck. Structures as shown in FIG. 3 can be formed by inserting sheet material comprising the microspheres 17 and support sheet 18 into a mold at the time of manufacture of the puck, whereupon the sheet material is vulcanized to the main body of the puck. Alternatively, the retroreflective sheet material can be adhered to the puck by adhesive. Preferably the retroreflective layers 15 and 16 are inlaid into the puck as shown so as not to extend above the adjacent, non-retroreflective surfaces of the puck. And in some embodiments, the exterior surfaces of the retroreflective layers are recessed below the adjacent non-retroreflective surfaces of the puck.

The lamp 11 attached to the camera 10 is directed to provide a light beam that substantially parallels the optical axis 21 of the camera. The possible path of a ray of light from the lamp 11 retroreflected by the hockey puck 12 is illustrated by the light ray 22. The retroreflection does not necessarily return an incident light ray along exactly the identical path it traveled to the retroreflective surface, but instead the retroreflected rays return as a narrow cone of light rays. Thus the illustrative ray 22 of light travels from the lamp 10 to the retroreflective surface 15 of the hockey puck 12, and then is retroreflected along a path within a narrow cone represented by the dashed lines 23. While the cone 23 is narrow, it is sufficiently wide so that it includes the lens 24 of the camera 10. The result is that light reflected from the hockey puck reaches the lens of the camera and intensifies the brightness of the image of the puck on a television screen.

Instead of projecting light directly from a lamp to the rink, the light beam can be projected through a beamsplitter positioned in front of the camera lens so as to project the light exactly along the optical axis of the camera. For such a procedure, a lamp is placed at the side of the camera in position to project at the beamsplitter a light beam that is perpendicular to the optical axis of the camera. The beamsplitter divides the light and directs part of it to the rink.

The lamp need not be affixed to the camera 10, but most conveniently it is attached to the camera so as to move with the camera and illuminate the scene being photographed by the camera. The lamp need not provide an intense or narrow beam of light to achieve the desired retroreflection. For example, the light beam will typically not provide illumination (such as that of a spotlight) that is visible to on-site spectators of the hockey match. And because of the narrowly directed nature of the retroreflected light rays, the retroreflected light will generally not be noticed by the players.

The invention is useful to enhance the visibility during a hockey match of other difficult-to-see items besides a hockey puck — such as numerals and team or player-position insignia on uniforms — as well as to enhance the visibility of items of other games, such as tennis balls and golf balls. In addition, retroreflective layers are attached to hockey sticks according to the invention to enhance the visibility of the sticks when they are moved. Particularly useful hockey sticks for the invention are the hockey sticks of molded reinforced polymeric material described in Johnson et al., U.S. Pat. No. 3,859,162, which is incorporated herein by reference. For purposes of the present invention, such molded hockey sticks are provided with retroreflective layers in one procedure by attaching retroreflective sheet material to the interior surface of the molds prior to introduction into the mold of the reinforced polymeric material. The retroreflective layers on the hockey sticks or on other implements of a game may be of distinctive colors or patterns to identify particular teams.

The invention will be further illustrated by the following example. A Sylvania "Sun Gun" Professional Model SG-60, 1000-watt directional floodlight, set for operation at low power, was mounted onto a standard television camera so that the central axis of the light beam from the floodlight was approximately parallel to the optical axis of the camera. Retroreflective layers of the type described in the U.S. Pat. No. 3,382,908 or 3,449,201, comprising a monolayer of glass microspheres partially embedded in the elastomeric support sheet, were adhered over the top and bottom surfaces and the cylindrical side surface of the puck. The camera and floodlight were positioned adjacent a hockey rink and the described puck was shot around the rink at a distance varying from about 30 to 230 feet from the camera and floodlight. The camera was operated during this time and the signals developed in the camera were fed to a television monitor. The puck was found to have a much greater visibility on the screen of the monitor than conventional pucks have, and the puck was easily followed at all times.

What is claimed is:

1. A method for enhancing the visibility on a television screen of small, difficult-to-see objects that are shot or thrown according to the rules of a telecast game, comprising:
   1. photographing the game with at least one television camera while the said object that is used in the game carries at least one retroreflective layer attached to the exterior surface of the object;
   2. projecting toward the game a light beam that is substantially parallel to, and no more than slightly spaced from, the optical axis of said television camera, so that the lens of the camera will be within the cone of light from the light beam that is retroreflected by the retroreflective layer carried on said object; and
   3. telecasting the picture photographed by the camera; whereby there is a visible contrast between the image of the object and the image of the background for the object on the screen of television receivers that receive the telecast picture.

2. A method of claim 1 in which the light beam is projected by a lamp affixed to said television camera.

3. A method for enhancing the visibility of a hockey puck on a television screen during telecasting of a hockey match comprising:
   1. photographing the hockey match with at least one television camera while the hockey puck that is being used in the match carries at least one retroreflective layer attached to the exterior surface of the puck;
   2. projecting toward the hockey match a light beam that is substantially parallel to, and no more than slightly spaced from, the optical axis of said television camera, so that the lens of the camera will be within the cone of light from said light beam that is retroreflected by the retroreflective layer carried on said hockey puck; and
   3. telecasting the picture photographed by the camera; whereby there is a visible contrast between the image of the hockey puck and the image of the background for the puck on the screen of television receivers that receive the telecast picture.

4. A method of claim 3 in which the light beam is projected by a lamp affixed to said television camera.

* * * * *